United States Patent [19]

Neely

[11] Patent Number: 4,754,296

[45] Date of Patent: Jun. 28, 1988

[54] METHOD OF AND APPARATUS FOR DISPLAYING ALPHANUMERIC RANGE IN CAMERA VIEWFINDER

[75] Inventor: Judith L. Neely, Reading, Mass.

[73] Assignee: Polaroid Corporation, Cambridge, Mass.

[21] Appl. No.: 800,314

[22] Filed: Nov. 21, 1985

[51] Int. Cl.[4] .................. G03B 3/00; G03B 17/20
[52] U.S. Cl. .................. 354/195.13; 354/289.1; 354/409; 354/475
[58] Field of Search .................. 354/195.13, 409, 475, 354/401, 289.1, 289.11, 217

[56] References Cited

U.S. PATENT DOCUMENTS

| | | | |
|---|---|---|---|
| D. 222,941 | 9/1970 | Knutson | D26/1 |
| D. 233,152 | 12/1971 | Knutson | D26/1 Q |
| 3,174,416 | 3/1965 | Heerklotz | 95/44 |
| 3,764,962 | 10/1973 | Bartel, Jr. | 340/3 R |
| 4,053,912 | 10/1977 | Okuno et al. | 354/225 |
| 4,060,817 | 11/1977 | Dionne | 354/195.13 |
| 4,099,190 | 7/1978 | Tuurnoka | 354/225 |
| 4,117,325 | 9/1978 | Holle et al. | 354/409 X |
| 4,171,896 | 10/1979 | Sato et al. | 354/225 |
| 4,217,050 | 8/1980 | Sato et al. | 354/225 |
| 4,304,475 | 12/1981 | Kitai et al. | 354/409 |
| 4,322,141 | 3/1982 | Tominaga et al. | 354/409 X |
| 4,322,153 | 3/1982 | Katayama et al. | 354/225 |
| 4,331,409 | 5/1982 | Cianci, Jr. et al. | 354/217 X |
| 4,354,748 | 10/1982 | Grimes et al. | 354/401 X |
| 4,508,440 | 4/1985 | Costa et al. | 354/187 |
| 4,526,444 | 7/1985 | Fantone et al. | 350/501 |
| 4,527,875 | 7/1985 | Shibata | 354/225 |
| 4,530,583 | 7/1985 | Yamada | 354/224 |
| 4,540,262 | 9/1985 | Nakai et al. | 354/195.13 |

FOREIGN PATENT DOCUMENTS 2515087  4/1975  Fed. Rep. of Germany .

OTHER PUBLICATIONS

Sonic-Meter by Vexilar 8-22-77, News Release and Descriptive Brochure.

*Primary Examiner*—Michael L. Gellner
*Attorney, Agent, or Firm*—Leslie J. Payne

[57] ABSTRACT

There is disclosed a method of an apparatus for displaying accurate camera-to-subject range information in alphanumeric form in a viewfinder of camera along with information as to whether a good or bad picture will be obtained of the subject at the sensed range and in the sensed scene brightness.

9 Claims, 2 Drawing Sheets

METHOD OF AND APPARATUS FOR DISPLAYING ALPHANUMERIC RANGE IN CAMERA VIEWFINDER

BACKGROUND OF THE INVENTION

The present invention relates generally to a method of and apparatus for displaying photographic information in a viewfinder of a photographic apparatus. More particularly, it relates to a method of and apparatus for displaying, in a viewfinder, alphanumeric range information together with exposure information utilizing such range information.

It is known generally that viewfinders are used for purposes of displaying various forms of information essential for enhancing the operation of a camera. For example, viewfinder windows are used to display exposure data. Earlier approaches along these lines utilized a needle and a scale of a meter which would appear superimposed on the scene. Some cameras with automatic exposure control systems incorporate a visible color signal in the viewfinder for warning the user when the prevailing ambient light is inadequate for a correct exposure. Other automatic cameras display the aperture value and shutter speed selected by the automatic exposure mechanism so that the photographer has a running check of the scene lighting conditions. U.S. Pat. No. 4,322,153 is an example of such a system. Still other kinds of cameras employ means for visually indicating the range of a subject to be photographed. For example, some single lens reflex cameras employ optical systems which provide an image in the viewfinder of the range value on the distance adjusting ring located on the camera. U.S. Pat. Nos. 3,174,416 and 4,053,912 are examples of such display systems. Still other kinds of cameras display ranging information with graphic symbols representing different ranging zones, such as described in U.S. Pat. No. 4,530,583. Known viewfinders may show in other ways the focusing zone to which the lens has been set.

None of the known viewfinder display systems, however, disclose a system in which subject range is automatically and electronically displayed in the viewfinder in alphanumeric form. Furthermore, none of the known prior art discloses such display system in which the displayed alphanumeric range information is coupled with exposure information utilizing such range information.

SUMMARY OF THE INVENTION

In accordance with the present invention there are achieved an improved viewfinder information display apparatus and method. Essentially, such method and apparatus automatically provide a visual display for a camera viewfinder of range information in alphanumeric form. Also, the visual display includes information regarding picture quality based on the range information.

For effectuating this method there are included the steps of transmitting ranging energy toward a subject to be ranged and deriving a ranging signal by measuring a characteristic of reflected or non-reflected ranging energy from the subject. This ranging signal is converted into a subject range display signal which facilitates displaying the subject range in alphanumeric form. In a preferred embodiment, the displaying is done in the camera viewfinder.

In another illustrated embodiment, there are provided steps for displaying other photographic information which incorporates subject range information. More specifically, the steps include sensing the scene brightness level prior to exposure and deriving a scene brightness level signal. The scene brightness signal is evaluated along with the subject range signal to provide output signals indicating whether a picture of the subject at such range and at such scene brightness level will be bad or good. This allows the user the opportunity of not taking a picture. These bad or good picture signals are displayed in the viewfinder contemporaneously with the alphanumeric range information.

In another illustrated embodiment, a strobe mode selector switch is actuated. When actuated the good/bad picture evaluation step includes evaluating a predetermined strobe or ambient mode signal along with the scene brightness level and subject range signals.

Among the objects of the invention are, therefore, the provision of an improved method of and apparatus for displaying visual information relating to the photographic process; the provision of an improved method of and apparatus for automatically displaying visual subject range information in alphanumeric form; the provision of the last noted type wherein the alphanumeric subject range information is displayed in the viewfinder; the provision of an improved method of and apparatus for displaying in the viewfinder other photographic information which is a function of the subject range; the provision of an improved method of and apparatus for displaying, in the viewfinder, signals indicating whether a picture will be bad or good as a function of scene brightness and subject range; the provision of an improved method and apparatus of the foregoing type wherein picture quality is determined as a function of subject range, ambient scene brightness level and a chosen ambient or strobe mode; and the provision of an improved method and apparatus which adjusts the brightness of the alphanumeric display in response to scene brightness.

Other objects and further scope of applicability of the present invention will become apparent after reading the detailed description thereof when taken in conjunction with the accompanying drawings in which like parts are designated by like reference numerals throughout the several views.

DETAILED DESCRIPTION

Figure 1:
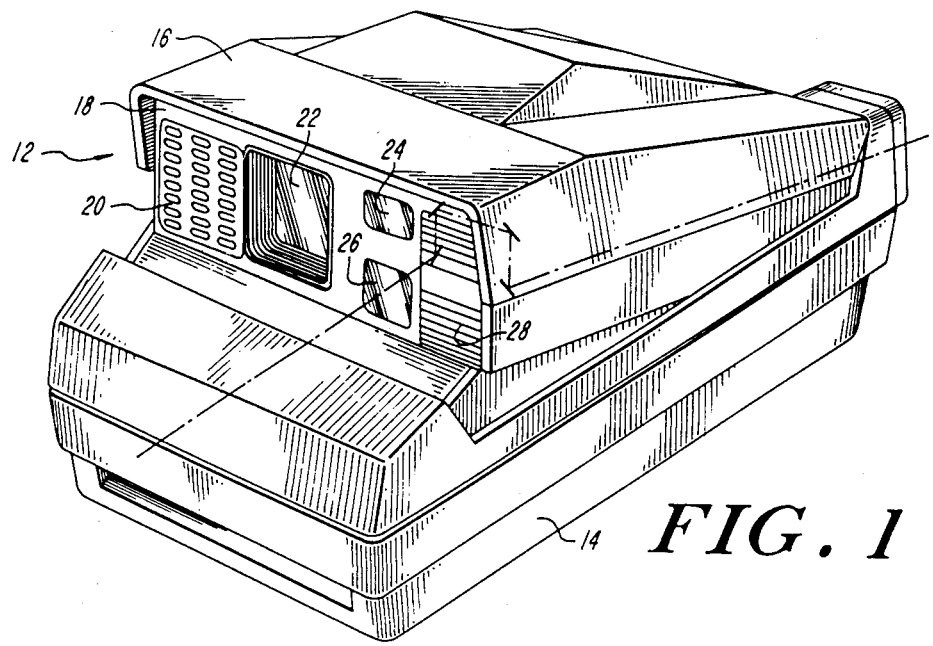
FIG. 1 is a perspective view of a photographic apparatus incorporating the novel and improved method of and apparatus for displaying photographic information in a viewfinder.
Figure 2:
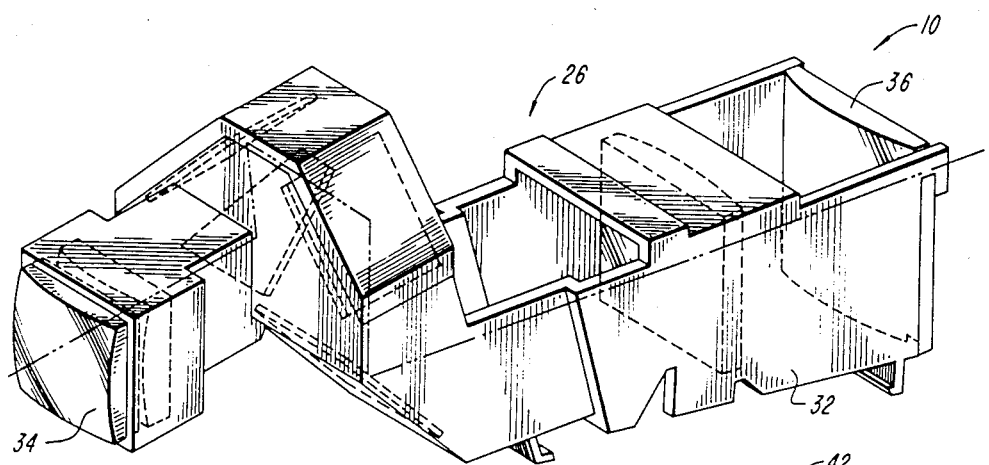
FIG. 2 is an enlarged and exploded perspective view of a viewfinder assembly and visual display arrangement; and, FIG. 3 is a schematic, in block diagram form, of a circuit arrangement used for effectuating the visual display function of this invention.
Figure 2:
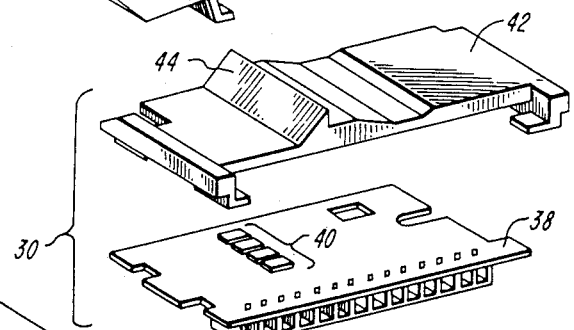
Figure 3:
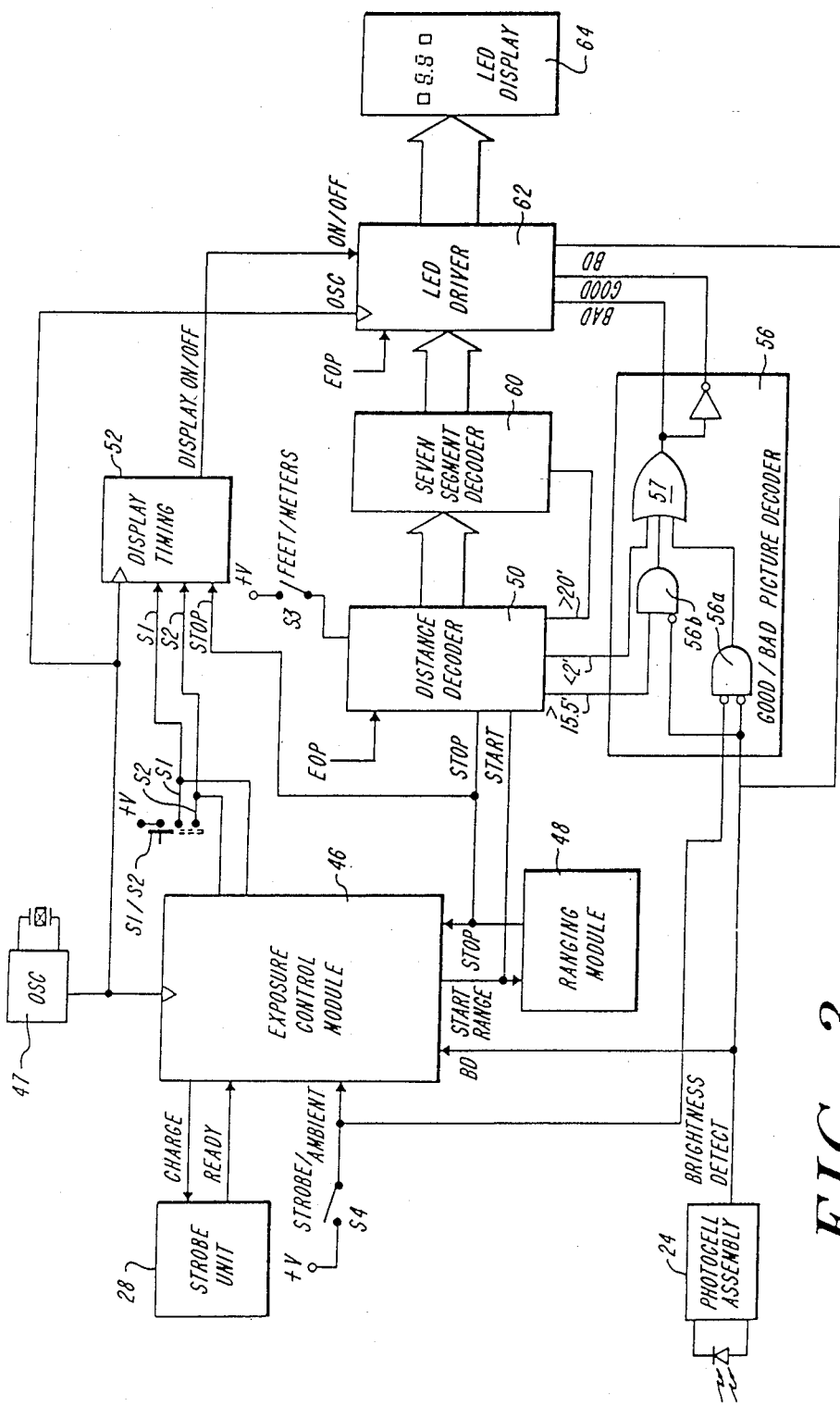

Reference is now made to FIGS. 1-3 for illustrating the improved photographic information display system 10 of the present invention. The principles underlying the display system or apparatus 10 can broadly be used in a variety of photographic apparatus of the type which include an automatic range finding system. In the illustrated embodiment, the display system 10 is used in conjunction with a self-developing type camera having automatic ranging, such as described generally in commonly assigned U.S. Pat. No. 4,526,444. Since the photographic camera apparatus 12 does not, per se, form an aspect of the present invention, only those features thereof necessary for an understanding of this invention will be set forth.

In the photographic apparatus 12 there is provided a first housing portion 14 and a second housing portion 16, the latter of which has one end attached pivotally to the former. The first housing portion 14 has a rearwardly slanting portion that terminates before a component module 18 mounted on the second housing portion 16.

The front face of the module 18 includes a sonar-type rangefinder 20, a taking lens assembly 22, a photocell assembly 24; a viewfinder lens assembly 26 and a source of artificial illumination, such as electronic strobe 28.

Reference is now made to FIG. 2 for showing portions of the viewfinder lens assembly 26 within which is positioned a viewfinder display arrangement 30. The display arrangement 30 is used for purposes of displaying the range information in alphanumeric form, and other exposure control information in accordance with this invention. Since details of the viewfinder lens assembly 26 do not, per se, form an aspect of the present invention only those details necessary for an understanding of the present invention will be set forth. A more detailed description of the lens assembly 26 is found the last-noted commonly-assigned U.S. patent. Suffice it to say, however, that there is provided a viewfinder tunnel assembly 32 connected to and between an eyepiece lens 34 and a front lens 36.

For displaying the visual information in the viewfinder so that it is visible through the eyepiece lens 34 there is provided a circuit board 38 having integrated therewith an assembly of light emitting diodes 40 for displaying the information desired. The lightemitting diodes are registered in optical communication with an optical member 42 including a prism 44 thereof mounted atop the circuit board 38. When the circuit board 38 is mounted to the optical member 42 and the latter is mounted to the tunnel 32 the prism 44 is in position in the plane of the real image formed by the eyepiece and front lenses 34, 36; respectively. The prism 44 is arranged to direct light from the assembly of LED's 40 into a lens group, wherein such light can be seen by an observer through the eyepiece lens 34 together with the image in the viewfinder lens assembly 26. The present invention includes within its spirit and scope the concept of displaying the visual information in other than the viewfinder.

Reference is now made to FIG. 3 for illustrating a schematic, in block diagram form, of further components of the present invention. There is disclosed a two-stage user operated switch S1/S2. The switch S1/S2 is operable for commencing a display mode when in one stage, and an exposure mode when in a second stage. The switch S1/S2 when depressed initially makes contact to close S1 and establish the first stage which allows the strobe unit 28 to be charged by a power source (not shown). In this regard, the exposure control module 46 allows the strobe unit 28 to charge and once the strobe unit 28 has been charged it transmits a strobe ready signal to exposure control module 46. The exposure control module 46 includes the logic controls (not shown) such as an exposure control chip and a processing control chip for controlling the photographic apparatus during both the display and exposure modes. The exposure control module 46 is initially actuated by pushing the switch S1/S2 to the first stage so that S1 is closed. An oscillator 47 controls timing of the exposure control module 46.

The camera ranging module 48 is actuated by the exposure control module 46 to issue a start range signal so as to commence a range determining function after the strobe unit 28 has been charged. As noted, in this embodiment the rangefinder 20 is of the sonar type described generally in the last referenced U.S. patent. The sonar rangefinder 20 includes a transducer (not shown) which emits sonar ranging energy towards a subject to be ranged in response to actuation thereof. More specifically, the start range signal actuates a range transmitting circuit (not shown) in the camera ranging module 48. This causes a burst of sonar ranging energy from the transducer. The transducer is actuated in correspondance with issuance of a start time signal which the exposure control module 46 inputs to a time measuring circuit (not shown) in the distance decoder module 50. The time measuring circuit includes among other components a series of flip-flops which serve to measure the time interval between emission of the sonar waves and detection of an echo of the reflected waves by the transducer. Detection of the echo triggers an echo detect circuit in the camera ranging module 48 which detect circuit issues a range stop signal. The range stop signal causes the time measuring circuit in the distance decoder module 50 to end its time counting operation and derive a time signal indicative of the elapsed time between sonar emission and echo receipt. The time measuring circuit in the distance decoder 50 will, therefore, provide a digital output signal corresponding to time. This digital time signal is converted to a subject distance or range signal expressed in terms of either units of feet or meters. This conversion is done by a known type of time/distance conversion circuit in the distance decoder module 50.

If the photographic subject is located beyond a preselected distance, for example, beyond 20 feet, the echo detect circuit will issue automatically a default time signal. This default signal is indicative of the fact that an echo was undetected during a specified time interval. In this embodiment, the default signal will be operative so that no range signal appears in the viewfinder. Towards this end the default signal is issued to the distance decoder module 50 which, in turn, transmits it to a seven segment decoder 60. The seven segment decoder 60 is then operative, in response to such signal, not to display any distance in the viewfinder. Alternatively, of course, the present invention envisions that a default signal can operate an LED so that it gives a visual indication of the fact that a subject is beyond 20 feet.

In this embodiment, the user can selectively convert the time based signals of the time measuring circuit into corresponding distance signals which can be displayed in units of feet or meters by manipulating a display mode switch S3 which is movable between a feet setting position and a meters setting position. The present embodiment is so structured that the S3 switch does not, when actuated, automatically convert a distance displayed in feet to one displayed in meters. To effect display of a distance reading in meters, a reranging must be commenced. Towards that end the S1/S2 switch is released and it automatically returns to the start condition. Thereafter, the switch S1/S2 is again depressed to the first mode (S1 closed), thereby effectuating a range display in meters. It will be appreciated, of course, that the S3 switch has been switched to the meters position. The S3 switch is a type which will when closed allow a reading to be in feet and when open allow a reading to be in meters.

Simultaneously, the range stop signal from the camera ranging module 48 is inputed to a display timing circuit 52. The display timing circuit 52 is operative to determine at what point in time and the time duration the LED display will be operative to display the information. For example, in the present embodiment, the display timing circuit 52 can display the alphanumeric range information and other information for a minimum of 50 ms. if the operator pushes the S1/S2 switch to the exposure condition. The alphanumeric range information will not appear if the S1/S2 switch is released. Also the range information will be visible if the S1 switch is only closed.

The exposure control module 46 is also operative to initiate a brightness detect mode. The brightness detect mode includes enabling the camera photocell assembly 24, including the photocell, to sense ambient scene brightness prior to exposure. It transmits such information via high/low brightness detect signals, which are digital in nature, to a good/bad picture decoder 56. The brightness detect signal is either high or low. In other words, the ambient scene light sensed by the photocell is compared to a preselected threshold value. If the sensed brightness is above the threshold value, a high brightness signal is issued. Conversely, if scene brightness is below the threshold value a low brightness signal is issued. The camera photocell assembly 24 includes an amplifier and comparator device. The high or low brightness detect signals are simultaneously issued to LED driver circuit 62 and to the exposure control module 46. These are sent to the latter for regulating exposure in a manner which is unrelated to the present invention, and to the former so that the LED driver circuit 62 will adjust the brightness of the display, as will be explained subsequently.

In this embodiment, the LEDs 40 will appear bright in high ambient light and dim in low ambient light. The present invention contemplates adjusting the brightness by regulating current sources. The brightness detect (BD) signal is also forwarded to the LED display driver circuit 62. This circuit 62, in response to a high brightness detect signal, will regulate its duty cycle so as to increase the length of time of each LED pulse for display purposes. It being understood that the longer the duty cycle the brighter the display. Conversely, the shorter the duty cycle the dimmer the display. In connection with regulating the duty cycle the LED driver 62 will control current sources, such as amplifiers, for regulating current drive.

Reference is now made to the good/bad picture decoder 56. This decoder 56 essentially serves to determine whether the resulting picture of the subject will be bad or good as a function of subject range and scene lighting. The picture decoder 56 will issue good or bad signals which are appropriately displayed by the LED arrangement 40 in the viewfinder assembly 26. Towards this end there is provided a yellow LED light (not shown) for bad pictures and a green LED light (not shown) for good pictures.

In this embodiment, there are three conditions under which the good/bad picture decoder 56 will issue bad picture signals. The first condition is if the subject is too close to the camera, for example, if the subject range is less than two feet or 0.6 meters. A second condition is if there is low ambient brightness and the strobe is off. The third condition is when the subject is at a distance greater than, the effective useful range of the strobe, for example greater than 15.5 feet and low brightess is detected. Of course, the present invention envisions providing, if desired, bad signals for other range and scene lighting conditions.

A user input or strobe selector switch S4 is associated with the good/bad picture decoder 56. The switch S4 is movable between a strobe position whereat the strobe 28 will be used for exposure purposes to an ambient position whereat the strobe will not be used. When the strobe switch S4 is actuated so that the strobe 28 will be used, a logic high signal will be forwarded to circuitry in the picture decoder 56. When the strobe is not intended to be used a logic low signal will be forwarded to the circuitry in the picture decoder 56. The good/bad picture decoder 56 includes circuitry having a series of logic gates which are structured and arranged to effectuate an evaluation of the range signal, the brightness detect signal and the presence or absence of a strobe charge signal. In particular, the logic gates includes an AND gate 56a which has inverted inputs from the brightness detect and from the S4 switch. The output of the AND gate 56a goes to OR gate 57. The inputs to the AND gate 56b are the signal from the distance decoder module 50 representative of the fact that the subject distance is greater than 15.5 feet and an inverted input from the brightness detect. The output of the AND gate 56b is inputed to the OR gate 57 along with an input from the distance decoder module 50 representative of the fact that the subject distance is less than 2 feet. After an evaluation of the foregoing type, either good or bad signals will be transmitted to the LED driver 62 which in turn activates the display module 64 which includes the LED's 40 for lighting the appropriate one of the green or yellow LED.

Referring back to the distance signal from the distance decoder module 50, it is transmitted to a suitable able seven segment decoder the device 60. The seven segment decoder device 60 converts the digital range signal into appropriate seven segment display signals. These display signals are for having the seven segment LED driver 62 actuate the display module 64 for the information that is desired.

Referring to the LED driver module 62, it includes an appropriate number of current sources (not shown) which control seven segment LEDs 40 and good/bad LEDs. The LEDs 40 display the range in numerical form whether in feet or meters including a display for a decimal point. The LED driver 62 is operable for a period of time determined by the display timing circuit 52. Of course, the module 64 includes the good and bad picture LEDs. The visual images from the LEDs are optically transmitted through the prism 44 and directed to the eyepiece 34. In this fashion the user will be able to directly view the distance in alphanumeric form and other information relating to whether the picture will be bad or good given the prevailing range and scene brightness conditions.

The two-stage switch S1/S2 can then be further depressed for commencing the exposure mode of the camera 12. In particular, the closing of the switch S1/S2 to the second stage transmits a signal to the exposure control module 46. This serves to activate the photocell assembly and shutter blade assembly (not shown) to perform the necessary operations for achieving an exposure. The operational steps for the exposure do not, per se, form an aspect of this invention. Thus, a detailed description thereof has been omitted. The exposure control module 46 when so actuated will also issue a reset signal to the ranging module, the distance decoder and the LED driver and display module.

It will be appreciated, therefore, that prior to the commencement of exposure the display system 10 can be used solely for purposes of displaying the subject range in alphanumeric form. Since exposure does not commence until the S1/S2 switch is depressed to the second stage the photographer can use the range information for a variety of purposes. Besides, pure subject range information being provided, the operator might experimentally determine the ideal range for a portrait and thereafter use the range display to easily duplicate the ideal distance.

The present invention also includes use of an end of pack signal. In particular, a sensing mechanism or switch (not shown) in the camera senses that a film pack does not contain film. The closing of the switch sends a signal to the distance decoder module 50 so that the distance decoder module will signal a "O" range value in the viewfinder. The closing of the switch also operates the LED driver 62 such that the EOP signal "O" range signal is caused to flash by virtue of enabling and disabling a current source in the LED driver.

Based on the foregoing description, the operation of the foregoing method and system are clear.

Since certain changes may be made in the above-described system and method without departing from the scope of the invention herein involved, it is intended that all matter contained in the description or shown in the accompanying drawing shall be interpreted as illustrative and not in a limiting sense.

What is claimed is:

1. A method of displaying ranging information in alphanumeric form in a photographic apparatus comprising the steps of:
    deriving a range signal representative of accurate apparatus-to-subject distance;
    converting the range signal into an apparatus-to-subject range display signal which facilitates electronically displaying the subject range in alphanumeric form; and,
    automatically electronically displaying the subject range defined by the display signal in alphanumeric form, said displaying step displaying the alphanumeric display signal in the viewfinder of the photographic apparatus;
    sensing scene brightness prior to exposure;
    deriving a scene brightness level signal;
    comparing the scene brightness level signal and the subject range signal provide output signals indicating whether a picture of the subject at the sensed range and at the sensed scene brightness level will be good or bad; and,
    displaying good or bad picture signals in the viewfinder.

2. The method of claim 1 wherein said comparing step further includes the steps of selectively utilizing a predetermined strobe mode signal having a predetermined value and comparing the strobe mode signal with the scene brightness level signal, and the subject range signal for use in determining whether an exposure of the subject will be good or bad.

3. The method of claim 1 further comprising the step of regulating brightness of the displayed good or bad picture signals and the alphanumeric range signal as a function of the sensed scene brightness.

4. The method of claim 3 further comprising the step of visually indicating in the viewfinder that a film pack to be used in the photographic apparatus is without film.

5. A system for displaying ranging information in alphanumeric form in a photographic apparatus comprising:
    means for transmitting ranging energy toward a subject to be ranged;
    means for deriving an apparatus-to-subject range signal by measuring a characteristic of reflected or non-reflected ranging energy from the subject;
    means for converting the subject range signal into a subject range display signal which facilitates electronically displaying the subject range in alphanumeric form; and,
    means for automatically electronically displaying the subject range defined by the display signal in alphanumeric form, said displaying means displaying the alphanumeric signal in a viewfinder of the photographic apparatus;
    means for sensing scene brightness prior to exposure;
    means for deriving a scene brightness level signal;
    means for comparing the scene brightness level signal and the subject range signal to provide output signals indicating whether a picture of the subject at the sensed range and at the sensed scene brightness level will good or bad; and, means for displaying good or bad picture signals in the viewfinder.

6. The system of claim 5 wherein said means for comparing includes means responsive to a strobe mode switch which in one mode utilizes a strobe mode signal having a predetermined value which is inputted to said comparing means so that said comparing means compares the strobe signal, the scene brightness level signal and the subject range signal for use in determining good or bad pictures.

7. The system of claim 6 including means for regulating the brightness of the display as a function of scene brightness.

8. In a camera system including a source of artificial illumination having a given effective range and a manually operable actuator, said camera system being adapted to expose a photographic film unit to scene light during an exposure interval during which said source of artificial illumination is activated to direct illumination towards the scene, the improvement comprising:
    means responsive to the actuation of said actuator prior to the commencement of an exposure interval to derive a first signal indicative of the ambient scene brightness level;
    means responsive to the actuation of said actuator prior to the commencement of an exposure interval to derive a second signal indicative of camera-to-subject distance;
    means for comparing said first and second signals prior to the commencement of an exposure interval to provide output signals indicating whether a picture of the subject at the sensed range and at the sensed scene brightness level will be good or bad; and,
    means for displaying good or bad picture signals in the viewfinder.

9. The invention of claim 8 additionally including a viewfinder and means responsive to said evaluating means for presenting an electronically viewable indication in alphanumeric form of the determination made by said evaluating means in said viewfinder prior to the commencement of an exposure interval.

* * * * *

UNITED STATES PATENT AND TRADEMARK OFFICE
CERTIFICATE OF CORRECTION

PATENT NO. : 4,754,296
DATED : June 28, 1988
INVENTOR(S) : Judith L. Neely

It is certified that error appears in the above-identified patent and that said Letters Patent are hereby corrected as shown below:

Claim 1, line 52, after signal, insert --to--.

Claim 5, line 26, after will, insert --be--.

Signed and Sealed this

Twenty-fifth Day of April, 1989

Attest:

DONALD J. QUIGG

Attesting Officer

Commissioner of Patents and Trademarks